Dec. 25, 1934.  J. S. BENROTH  1,985,334
GAUGE STICK WIPER
Filed Jan. 12, 1934
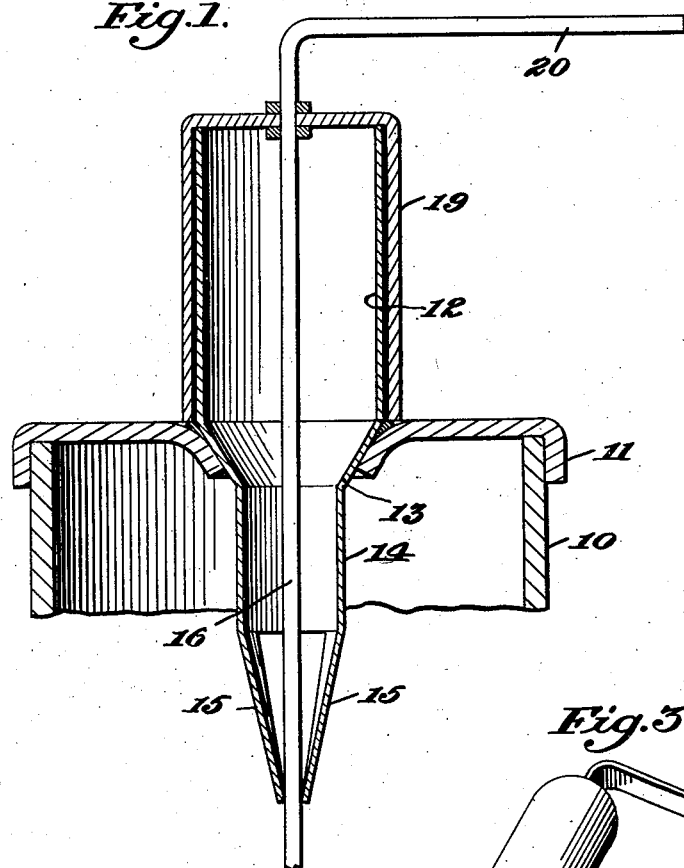
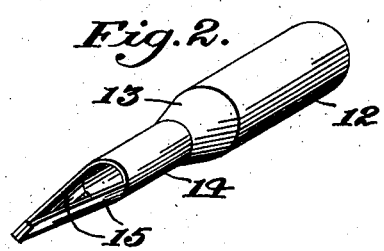
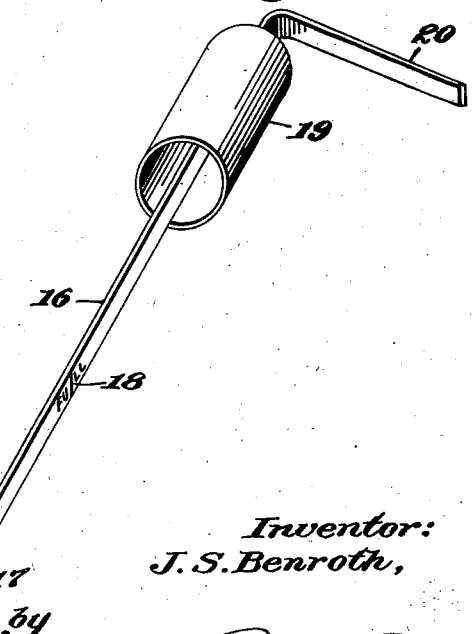
Inventor:
J. S. Benroth,
by
Att'ys.

Patented Dec. 25, 1934

1,985,334

UNITED STATES PATENT OFFICE 1,985,334

GAUGE STICK WIPER

Julius S. Benroth, Phoenix, Ariz., assignor of one-fourth to Morton Edward Kimsey, Scottsdale, Ariz., one-fourth to Thomas John Tunney, Phoenix, Ariz., and one-fourth to James A. Saunders, Washington, D. C.

Application January 12, 1934, Serial No. 706,431

3 Claims. (Cl. 73—120)

The present invention relates to improvements in an ullage gauge, and is particularly adapted for employment with a gauge stick employed for determining the level of lubricating oil in the crank case of an automobile engine.

One of the features of the present invention is the provision of a structure in which the gauge is wiped by devices located within the apparatus, preparatory to the measuring of the oil level.

Another feature of the present invention is the provision of a self-contained structure which may be mounted at a desired point above the level of liquid in the container to be measured, and operating to protect the stick aperture against the access of dirt.

A further feature of the present invention is the provision of a simple and compact structure which may be employed with already constructed containers to provide a simple protected means for gauging the liquid level therein.

With these and other objects in view, as will appear in the course of the following specification and claims, an illustrative form of employing the invention is shown on the accompanying drawing, in which:

Figure 1 is a diametrical sectional view showing the invention employed on the breather cap of an automobile engine.

Figure 2 is a perspective view showing the fixed tube and wiper portions of the apparatus.

Figure 3 is a corresponding perspective view of the removable portion of the apparatus.

The automobile engine (not shown) is illustrated in Figure 1 as having an upwardly extending filler pipe 10 with a cap 11. The crank case and filler pipe provide a low point in the system, so that the gauging of the lubricating oil therein will indicate the supply of oil available for engine purposes.

The cap 11 is shown as apertured for receiving the fixed structure of the wiping and closing device, which comprises a portion 12 of larger diameter extending upwardly from the cap 11, a shoulder 13, a portion 14 of smaller diameter, and a pair of opposed spring fingers 15 which converge downwardly and by their resilient action engage against the gauging stick to wipe oil therefrom. This member may be constructed integrally, and inserted in the aperture of the filler cap 11 and secured thereto as a squeeze fit, or by solder.

The movable member comprises the gauge stick 16, of greater width than thickness, and preferably has indicia 17 and 18 thereon appropriate to the dimensions of the crank case to indicate when a minimum and when a maximum oil level is present. The rod 16 extends upwardly through a cap member 19 and has an angularly bent end 20 providing a handle by which the movable member may be withdrawn from the fixed member. The cap 19 has a closed end and is tightly secured to the stick 16.

When normally in position, the wider faces of the gauge stick 16 are engaged by the spring fingers 15 and the cap 19 extends downwardly around the enlarged diameter 12 of the fixed member, the gauge stick being located within the crank case as usual.

When it is desired to gauge the oil within the crank case, the handle 20 is grasped and the stick drawn upwardly thereby. The spring fingers 15 wipe the oil from the wider faces of the gauge stick 16. When the stick has been withdrawn from the fingers 15, as indicated by the lesser resistance to its upward movement, the handle 20 is turned through 90 degrees about the axis of gauge stick 16, so that the narrower surfaces of the gauge stick 16 are in line with the spring fingers 15. The gauge stick is forced downward again and then withdrawn without further substantial angular movement of the handle 20. The stick may then be examined to determine the "oil mark" thereon. By having the portion 12 of larger diameter than the gauge stick proper, it serves to collect the drip of oil from the end of the stick and to make it easy to insert the stick within the fixed member, if it be removed therefrom.

The movable member is then returned to its former position by pushing it downward so that the spring fingers 15 are again engaged with the wider surfaces thereof. It will be noted, however, that the gauge stick may be withdrawn and returned, or rotated in any position, and that the spring fingers 15 will operate to indicate the necessary position at which it must be withdrawn for the wiping action.

The structure is of little encumbrance, and prevents the access of dust through the aperture employed for gauging.

The invention may obviously be employed in many ways within the scope of the appended claims.

Having thus described the invention, what I claim as new and desire to secure by Letters Patent, is:

1. In an ullage apparatus for a container, a fixed structure having opposite spring fingers and supported by the wall of the container, and a movable member including a gauge stick of greater width than thickness and cooperative with said fingers during the withdrawal of the gauging stick for the wiping of oil from said stick, said stick being insertable into the container in either of two positions, in one of which the wide surfaces are engaged with the fingers and in the other of which the wide surfaces are free of said fingers.

2. In an ullage apparatus for a container, a fixed member mounted on the container and having an aperture therethrough and opposite spring fingers in line with said aperture, and a movable member including a gauge stick insertable through said aperture and between said fingers, said fixed structure extending beyond the container wall, and said movable structure including a cap fitting around the extension of the fixed member.

3. An ullage apparatus for an automobile engine including a fixed member mounted on the engine crank case and having an aperture therethrough with opposed spring fingers in line with the aperture, a gauge stick of greater width than thickness insertable through the aperture and between the fingers and having an angular bend at its upper end, and a dust cap secured to said stick and cooperating with the fixed member to prevent access of dust into the crank case through said aperture.

JULIUS S. BENROTH.